United States Patent
Vatchiants (10) Patent No.: US 7,105,127 B2
(45) Date of Patent: Sep. 12, 2006

(54) METHOD FOR PRODUCTION OF METAL FOAM OR METAL-COMPOSITE BODIES WITH IMPROVED IMPACT, THERMAL AND SOUND ABSORPTION PROPERTIES

(75) Inventor: Serguei Vatchiants, Senneville (CA)

(73) Assignee: AGS Taron Technologies Inc., Boucherville (CA)

( * ) Notice: Subject to any disclaimer, the term of this patent is extended or adjusted under 35 U.S.C. 154(b) by 0 days.

(21) Appl. No.: 10/619,717

(22) Filed: Jul. 15, 2003

(65) Prior Publication Data
US 2004/0081571 A1  Apr. 29, 2004

Related U.S. Application Data

(63) Continuation of application No. PCT/CA02/00073, filed on Jan. 16, 2002.

(60) Provisional application No. 60/261,218, filed on Jan. 16, 2001.

(30) Foreign Application Priority Data

| Jan. 29, 2001 | (CA) | 2332674 |
| Apr. 12, 2001 | (CA) | 2344088 |

(51) Int. Cl.
*B22F 3/10*     (2006.01)
(52) U.S. Cl. .......................................... 419/2
(58) Field of Classification Search .............. 419/2
See application file for complete search history.

(56) References Cited

U.S. PATENT DOCUMENTS

| 3,087,807 A | * | 4/1963 | Allen et al. ............ 75/415 |
| 4,207,400 A | * | 6/1980 | Dahms .................. 521/112 |
| 5,151,246 A | * | 9/1992 | Baumeister et al. .......... 419/2 |
| 5,393,485 A | * | 2/1995 | Worz et al. ................ 419/41 |
| 5,930,580 A | * | 7/1999 | Everett ..................... 419/2 |
| 6,080,357 A | * | 6/2000 | Sugikawa ................. 419/2 |
| 6,087,024 A | * | 7/2000 | Whinnery et al. ........ 428/613 |
| 6,391,250 B1 | * | 5/2002 | Wolfsgruber et al. ........ 419/2 |

(Continued)

Primary Examiner—Daniel Jenkins
(74) Attorney, Agent, or Firm—Bereskin & Parr (57) ABSTRACT

A method for the production of foamable or foamed metal pellets, parts and panels. The method comprises the steps of: i) providing a mixture of a metal alloy powder with a foaming agent powder, ii) pre-compacting the mixture of step i); iii) heating the pre-compacted mixture of step ii) to a temperature below a decomposition temperature of the foaming and at which permanent bonding of the particles occurs v) hot compacting the body for producing a compacted body made of a metal matrix embedding the foaming agent; and vi) reducing the compacted body into metal fragments and thereby obtaining dense foamable metal chips. A method for the production of a foam metal using a closed volume metal shell is also disclosed. The method comprises the steps of: a) providing metal pieces and reducing said metal pieces into smaller metal particles; b) mixing the metal particles with an additive having a decomposition temperature that is greater than a solidus temperature of said metal particles; c) pouring the mixture of step b) into a closed volume metal shell having a given thickness and providing the metal shell with at least one passage for gases to escape; d) reducing the thickness of the metal shell by applying pressure; e) heating the metal shell to a temperature above said solidus temperature of the metal particles and below said decomposition temperature of the additive, and immediately applying pressure on the metal shell sufficient to compress the metal particles and to create micro shear conditions between the metal particles so as to obtain a dense metal product.

24 Claims, 9 Drawing Sheets

U.S. PATENT DOCUMENTS 6,403,023 B1 * 6/2002 Kim et al. .................... 419/2
6,464,933 B1 * 10/2002 Popoola et al. ............... 419/2
6,524,522 B1 * 2/2003 Vaidyanathan et al. ........ 419/2
6,660,224 B1 * 12/2003 Lefebvre et al. .............. 419/2

* cited by examiner

METHOD FOR PRODUCTION OF METAL FOAM OR METAL-COMPOSITE BODIES WITH IMPROVED IMPACT, THERMAL AND SOUND ABSORPTION PROPERTIES

PRIOR APPLICATIONS

This application is a continuation of pending International Patent Application No. PCT/CA02/00073 filed Jan. 16, 2002, which designates the United States and claims priority of pending application Ser. No. U.S. 60/261,218 filed Jan. 16, 2001, CA 2,332, 674 filed Jan. 29, 2001 and CA 2,344, 088 filed Apr. 12, 2001.

FIELD OF THE INVENTION

The present invention relates to the field of powder metallurgy. More specifically, it concerns a method of manufacturing foamable metal or metal-composite bodies and their use, particularly as lightweight and stiff material with improved impact, energy, sound absorption and heat retardant properties. It also preferably concerns environmentally friendly and low cost material produced from recycled aluminum alloys or scrap with broad range of chemical composition.

BACKGROUND OF THE INVENTION

Already known in the prior art, there is German patent no 4101630 (U.S. Pat. No. 5,151,246) which describes a method for the production of porous semi-finished products from aluminum and copper-based alloy powders. The method described therein comprises the steps of mixing of an alloy powder with a foaming agent, filling a press container with the mixture, simultaneously heating the filled container and applying pressure at which the foaming agent does not decompose, simultaneously cooling and removing the pressure, disassembling of the container followed by pushing of the solid briquette out of it, which is immediately heat treated to produce a porous body or is subjected to preliminary hot deformation via extrusion or rolling followed by heat treatment. A very narrow range of products in terms of sizes and shapes can be produced with such method since the weight of the briquette is 2–5 kg. In addition, this method demonstrates a very low output because of the prolonged heating of the large size press container filled with the powder mixture. Even in the case where the powder mixture would be heated in a container having 100 mm in diameter and 400 mm in height, the heating operation would be economically not feasible.

Also known, there is a method for the production of porous semi-finished products from metallic powders that incorporates different variants.

A first variant includes the steps of coating the bottom floor of a press container with a metallic layer free of foaming agent, covering the metallic layer with a powder mixture comprising a foaming agent, and then covering the layer of powder mixture with a second metallic layer free of foaming agent. The container is then heated, and hot compaction is carried out. The shape of the body produced can be changed via deformation. Then, the body is foamed for formation of a new body wherein a high porous foamed metallic layer appears between two metallic layers.

A second variant includes the steps of disposing a dense metallic disk in an empty press container adapted for extrusion and filling the container with a powder mixture containing a foaming agent. Then, the container with the powder mixture is subjected to heating followed by the application of a pressure of about 60 MPa. Due to the pressure, the central part of the hard metallic disk, which blocks the hole of the press die, begins flowing through this hole and ensures extrusion process. During subsequent extrusion stages, the compacted powder mixture plastically deforms and flows through the die hole. Also in this case, the dense metallic layer covers the extruded powder mixture, which is ready for foaming. After foaming of this combined body the metallic layer covers a core consisting of high porous foam.

The combined billets produced via both variants can be further rolled in sheets, and due to a heat treatment temperature, can be transformed in a porous metallic body (U.S. Pat. No. 5,151,246, September, 1992, B 22 F 3/18, B 22 F 3/24).

Also known in the prior art, there is a process including the steps of mixing of an alloy powder with a foaming agent and rolling the mixture at high temperature (in the range of about 400° C. for aluminum) in several rolling passes. Intermediate heating of the pre-rolled material following the individual roll passes is a significant measure to largely avoid creation of edge cracks. This produces a bonding of metal and propellant powder particles in the roller nip and forms a gas-tight seal for the gas particles of the propellant. This body can be transformed by heat treatment in a porous metallic body.

The disadvantages of these techniques are the limited possibility of production of semi-finished products, especially sheets of commercial sizes, low product yield and output, high manufacturing cost.

Also known in the general field of powder metallurgy, there are the processes described in EP 0127312 and in U.S. Pat. No. 4,820,141 (EP0271095). These documents which do not concern the production of foam metal are given as examples of art related to the present invention.

EP 0127312 discloses a process for the consolidation of metal powders into slab configuration in which the metal powder is encapsulated, heated and inserted in a containment die and is subjected to a rolling operation to consolidate the powder.

U.S. Pat. No. 4,820,141 discloses a method for forming non-equilibrium and/or metastable metallic or non-metallic powder, foil or fine wire material into solid body. The method disclosed comprises charging the material into a metal container, subjecting the metal container containing the material to rolling at a temperature at which the inherent properties of the material are maintained, and thereafter removing the metal container.

The method of the present invention is distinct from and overcomes several disadvantages of the prior art, as will be discussed in detail below.

SUMMARY OF THE INVENTION

In accordance with a first aspect, the present invention concerns a method for the production of metal chips comprising the steps of:

i) providing a mixture of a metal alloy powder with a foaming agent powder, the foaming agent having a given decomposition temperature above which the foaming agent decomposes into gas, and the powders comprising finely dispersed solid particles;

ii) pre-compacting the mixture of step i);

iii) heating the pre-compacted mixture of step ii) to a temperature below the decomposition temperature and at which permanent bonding of the particles can occur;

v) hot compacting the mixture obtained in step iii) for producing a compacted body made of a metal matrix embedding the foaming agent; and vi) reducing the compacted body into metal fragments and thereby obtaining foamable metal chips.

Preferably, the step i) of providing the metal alloy powders and the foaming agent powder comprises the step of:

disintegrating metal scraps, metal particles or metal chips into the metal alloy powder.

According to one alternative, the method comprises, after step vi), the steps of:

heating the foamable chips to a temperature below a liquidus temperature of the metal alloy and sufficient to make the metal chips plastic; and extruding the heated metal chips for producing a foamable metal wire.

The foamable metal wire obtained can advantageously be cut into smaller foamable wire segments.

According to a second alternative used for producing porous pellets, the method preferably comprises, after step vi), the step of:

vii) heating the foamable metal chips obtained in step vi) to a temperature above the decomposition temperature of the foaming agent.

In this second alternative, the method preferably comprises, prior to step vii) of heating the metal foamable metal chips, the step of mixing said foamable metal chips with other powders, for instance refractory material powders. More preferably, prior to mixing the foamable metal chips with the refractory material powders, the method comprises the steps of heating the foamable metal chips to a temperature below a solidus temperature of the metal alloy and sufficient to make the metal chips plastic; and shaping the metal chips into metal granules, for instance spherical granules.

The shaping of the metal chips into spherical metal granules preferably comprises the steps of dispersing the heated chips as a monolayer on a flat heated surface; and applying a heated plate over the monolayer, and shaping the metal chips by simultaneously applying pressure with the heated plate and performing circular movement with the same.

In both alternatives described above, the method may further comprises, after step vi) of disintegrating, the step of classifying the metal chips by grain size. The grain sizes preferably ranges from 1.5 mm to 40 mm.

The metal alloy powders used in the process are preferably aluminium alloy powder. It is however worth noting that any suitable metal alloy powders commonly used in the art, for example copper alloy powders can be used.

Also preferably, the step of v) of hot compacting is hot rolling.

The present invention also concerns the use of porous metal pellets as described above as fillers for a material selected form the group consisting of a polymeric material, a soundproof material, a fireproof material and a shock absorption material.

The polymeric material is preferably a resin and even more particularly an expandable resin.

According to a second aspect, the present invention also provide a method for the production of a dense metal product comprising the steps of:

a) providing metal pieces and disintegrating said metal pieces into smaller metal particles;

b) mixing the metal particles with an additive having a decomposition temperature that is greater than a solidus temperature of said metal particles;

c) pouring the mixture of step b) into a closed volume metal shell having a given thickness and providing the metal shell with at least one passage for gases to escape;

d) increasing the density of the metal shell by applying pressure;

e) heating the metal shell to a temperature above a temperature equal to said solidus temperature of the metal particles minus 55° C. more or less 5° C. (for example if the solidus temperature is 480° C., the metal shell will be heated at a temperature above 480° C. minus 55° C., that is to say above 425° C. more or less 5° C.) and below said decomposition temperature of the additive, and immediately applying pressure on the metal shell sufficient to compress the metal particles and to create micro shear conditions between the metal particles so as to obtain a dense metal product.

The metal pieces are preferably made of recycled aluminium scraps. Advantages of the process in such case are the following: its environmental friendliness since it uses recycled material, its cost effectiveness since the recycled aluminum scraps are readily available at low price. Another advantage is the fact that the chemical impurities contained in the aluminum metal scraps work as useful additives, which provide advantageous predetermined properties to the final product.

The smaller particles of step a) are preferably metal chips or a powder of finely dispersed metal particles.

Preferably, the method comprises, prior to step c), the step of pre-compacting the mixture. More preferably, the pre-compacting is performed by vibration.

Also preferably, the additive is a foaming agent, preferably selected from the group consisting of $TiH_2$ and $CaCO_3$ that decomposes into gas at a temperature greater than the above-mentioned decomposition temperature. In this case, the method further preferably comprises, after step e), a step of heating the dense metal product, with or without the metal shell, to a temperature greater than the decomposition temperature of the foaming agent, for obtaining a foam metal product.

In step e), the pressure is preferably applied by hot rolling the metal shell. More preferably, the hot rolling is performed with a compression force sufficient for obtaining a 95–100% dense metal product.

The closed volume metal shell used in step b) preferably comprises two continuous longitudinal main surfaces with side edges, and is deformable in a cross direction. The two longitudinal surfaces can be obtained from two coils of metal strip as will be discussed further below. In this case the hot rolling of step e) is preferably performed by at least one roll moving along one of the surfaces of the shell. Most preferably, the shell is hot rolled between two rolls.

The continuous surfaces are preferably partially closed at their side edges so as to provide the at least one passage for metal to escape or leaving gases way to escape in longitudinal direction. The partial closing can made by a process selected from the group consisting of discontinuous welding, bending, clamping and bonding.

Alternatively, the closed volume metal shell can be obtained by providing a flat or special shape pan with a lid. In this case, step c) comprises the steps of pouring the mixture into the pan and closing the lid of the pan leaving the at least one passage. Such passage(s) can be obtained by discontinuously welding, bending, clamping or bonding the lid to the side walls of the pan or by providing perforation in the shell itself.

The step c) of increasing the density of the metal shell preferably comprises the step of cold rolling the metal shell.

According to a still preferred embodiment of the invention, the method incorporates mixing of powder aluminum alloys of various systems: Al—Cu—Mg—Si, Al—Mg—Si, Al—Mg—Cu—Si (cast alloys), Al—Cu—Mg—Mn, Al—Mg—Cu, Al—Zn—Cu—Mg, Al—Zn—Mg—Cu (wrought alloys) with a foaming agent. In one variant the mixture obtained is filled in a split reusable mould, which is heated with the powder mixture. Heating of the powder mixture is carried out at a temperature, which ensures sintering after cooling to the temperature 10–20° C. below the solidus of most fusible eutectics. As a result, the powder mixture looses its flowability. After removing the bottom of the mould, the hot mould is placed on the container of a vertical press. The ram of this press pushes the sintered powder mixture out of the mould into the press container, then a dummy-block is placed and hot compaction of the sintered powder mixture is carried out at a low specific pressure to produce porous (86–92% relative density), and easy breakable briquettes. Using highly efficient machines, the cooled briquettes are reduced to fragment-shaped chips with powder particles of 0.5–5.0 mm in size, chemical composition of which conforms to that of initial aluminum alloy powder with uniform distribution of the foaming agent.

The method of the present invention can be used for production of porous metal bodies for the parts and structural elements used in civil-engineering, machinery, automotive and aircraft and other industries wherein combination of such unique properties of this material as high specific strength and rigidity, energy absorption, heat insulation and sound-proofing, light weight, incombustibility, buoyancy and absolute environmental acceptability are required.

BRIEF DESCRIPTION OF THE DRAWINGS

These and other objects and advantages of the invention will become apparent upon reading the detailed description and upon referring to the drawings in which FIGS. 1 to 7 are schematic representations of the sequence of steps of a method according to a preferred embodiment of the invention. The detailed description of each figure is as follows:

While the invention will be described in conjunction with example embodiments, it will be understood that it is not intended to limit the scope of the invention to such embodiments. On the contrary, it is intended to cover all alternatives, modifications and equivalents as may be included as defined by the appended claims.

DESCRIPTION OF PREFERRED EMBODIMENTS

The purpose of the present invention is the production of complex and simple shape products out of continuous hot-rolled sheets of commercial sizes made from the chips produced from hot-compacted briquettes. The technical result obtained due to realization of the invention incorporates a dramatic increase in product yield (creation of a waste-free technology), a reduction in manufacturing cost of porous products, broadening of the range of products in terms of their geometrical sizes, mechanical, thermal and acoustic absorption properties and density.

Figure 1:
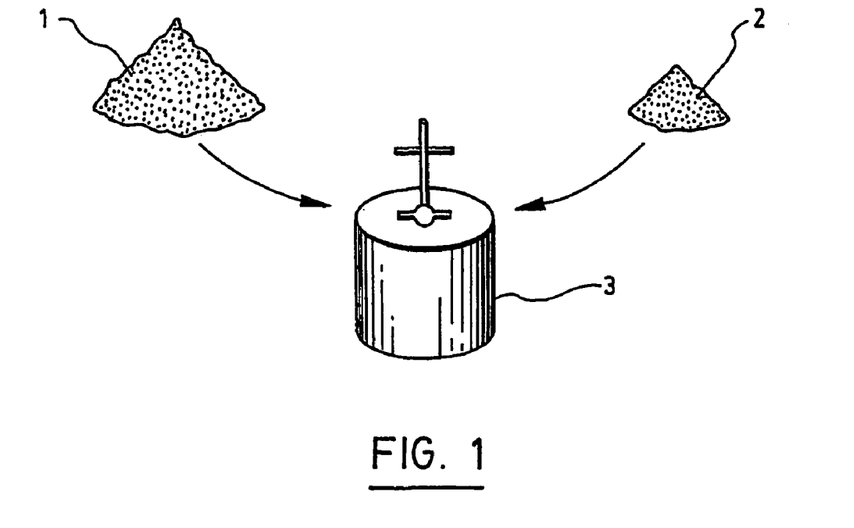
FIG. 1 schematically represents the step of mixing of metal powders with a foaming agent powder.
Figure 2:
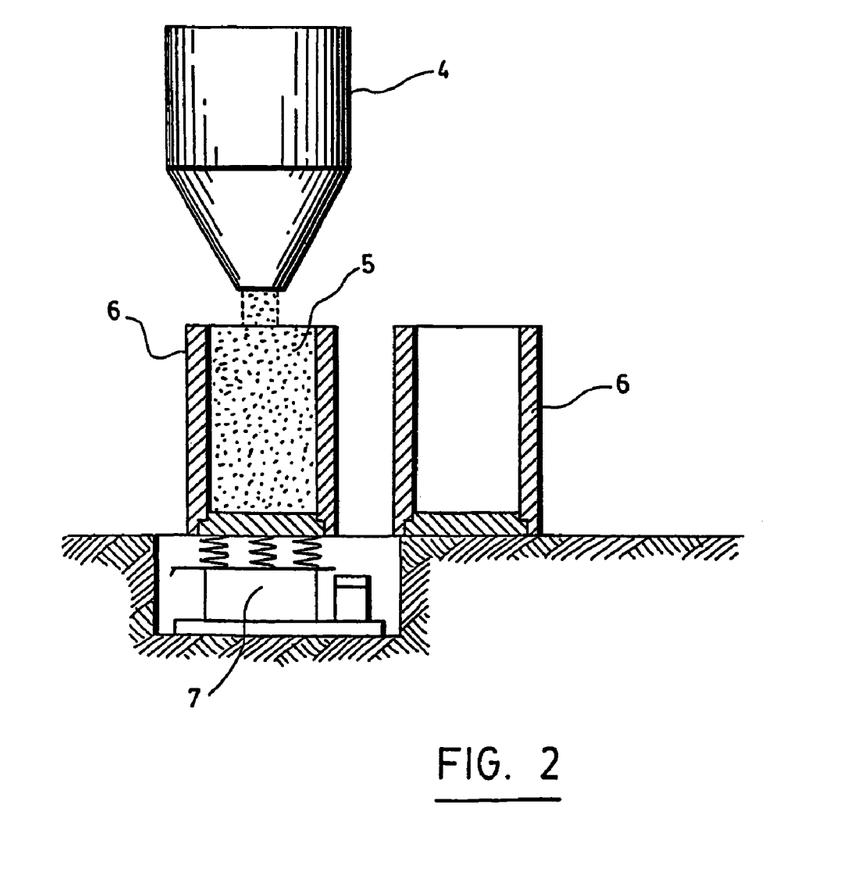
FIG. 2 represents the step of pouring the mixture into a reusable shell and of pre-compacting the mixture by vibration.
Figure 3:
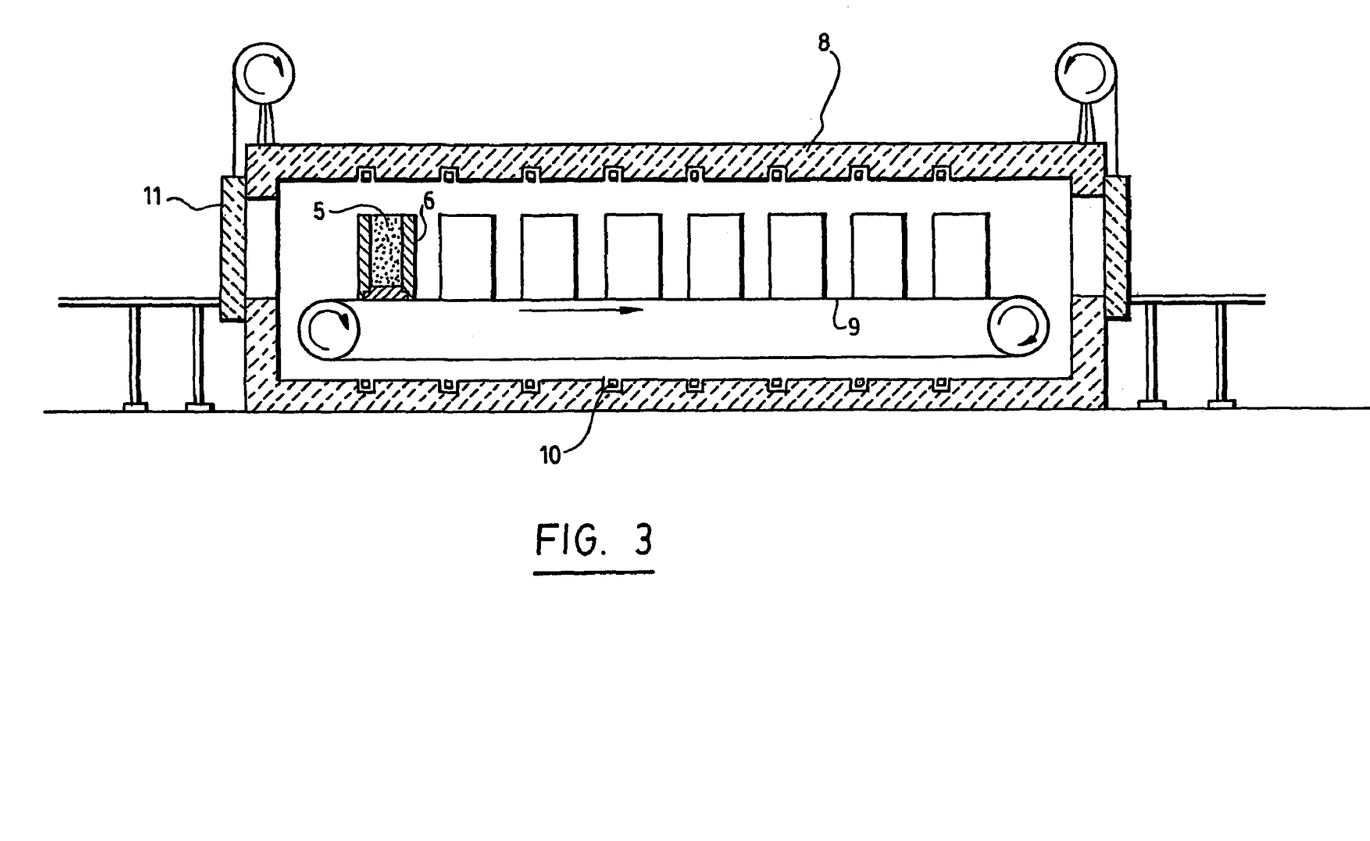
FIG. 3 represents the step of sintering.
Figure 4:
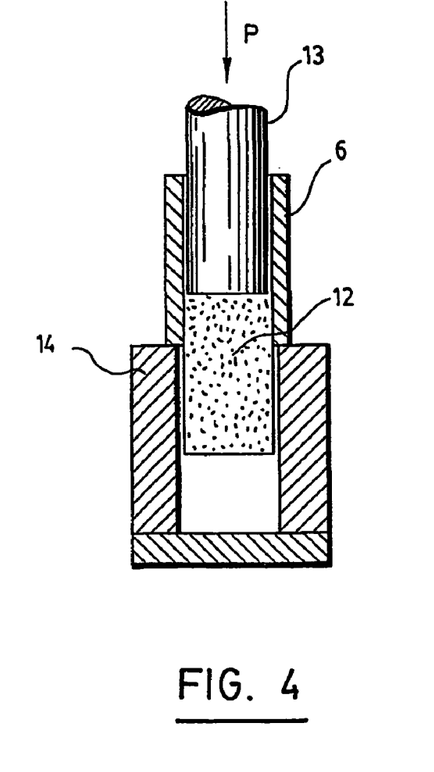
FIG. 4 represents the step of pushing a sintered briquette from a reusable can into press mould.
Figure 5:
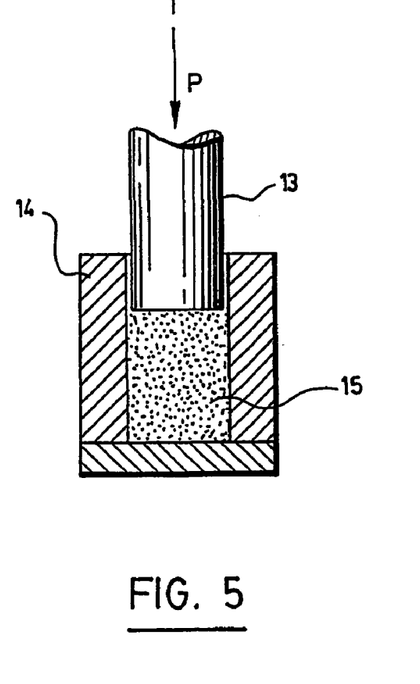
FIG. 5 represents the step of compaction of the sintered briquette.
Figure 6:
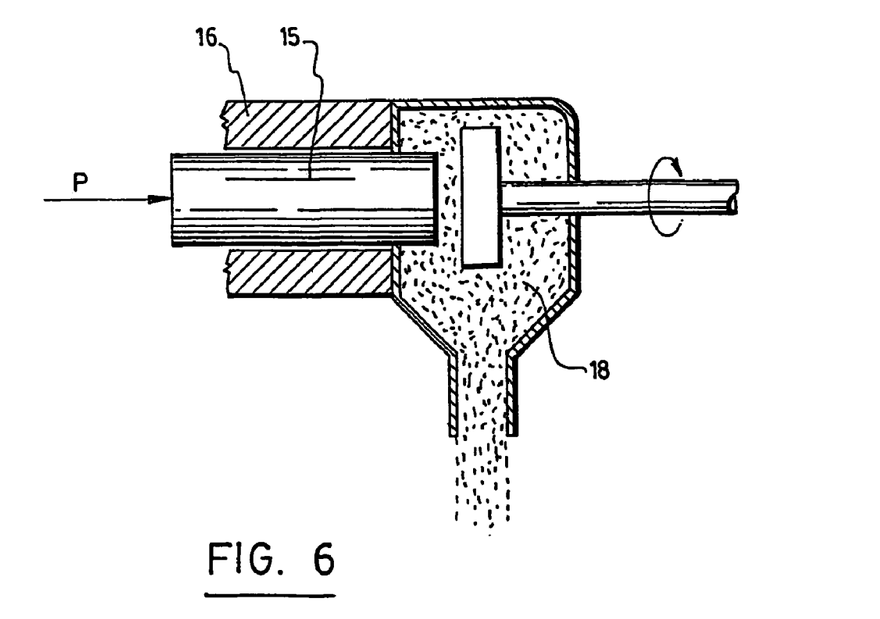
FIG. 6 represents the step of reducing the body into foamable chips.

Referring to FIGS. 1 to 6, the method of production of porous products from aluminum alloys incorporates mixing of metal particles (1) including powder, scrap pieces, pellets, bits and/or chips of an aluminum alloy containing two or more alloying elements, for example, selected from the group consisting of: Al—Cu—Mg—Si, Al—Mg—Si, Al—Mg—Cu—Si (cast alloys), Al—Cu—Mg—Mn, Al—Mg—Cu, Al—Zn—Cu—Mg, Al—Zn—Mg—Cu (wrought alloys), as well as pure metals (with or without additives) with a powder of a foaming agent (2), the foaming agent (2) having a decomposition temperature exceeding that of solidus of the aluminum alloy powder matrix. The mixture (5) obtained is filled in a split reusable mould (6) that is heated with the powder mixture (5), as shown in FIG. 3. Heating of the powder mixture (5) is carried out at a temperature that ensures liquid-phase sintering after cooling to 10–20° C. below solidus temperature of the lowest melting point eutectic. As a result, the powder mixture now in the form of liquid phase sintered briquettes (12) loses its flowability. After disassembling of the mould (6), the hot mould is placed on the container (14) of a vertical press. The ram (13) of this press (14) pushes the sintered powder mixture (12) into the press container (14), then dummy-block is placed and hot compaction of the sintered powder mixture is carried out at a low specific pressure, as shown in FIG. 5. The hot-compacted briquettes (15) produced show a density of 86–92 rel. %. These briquettes (15) compacted at a low pressure are porous (8–14 rel. %) and brittle, thus easily breakable. Referring to FIG. 6, using highly efficient machines, the cooled briquettes (15) are reduced to fragment-shaped chips (18) with chips particles of 0.5–5.0 mm in size, chemical composition of which conforms to that of initial aluminum alloy powder with uniform distribution of the foaming agent.

Also preferably, the chips (18) are classified by grain sizes from 1.5 up to 40 mm, preferably up to 5 mm, each size fraction is mixed with fine refractory material powders passive to aluminum, then the mixture is filled in moulds and heated in a furnace up to a foaming temperature which exceeds the liquidus point by 50–70° C.; after completion of the foaming process, the mixture is screened to separate the refractory material powders from porous chips.

According to another preferred embodiment of the invention, the chips produced are classified by grain sizes from 1.5 up to 40 mm, preferably up to 5 mm, each size fraction is heated up to a temperature below the solidus point of the alloy by 10–100° C. and then dispersed as a monolayer on a flat heated surface and then the fragment-shaped chips are pelletized by circular movements of a heated massive disk-shaped plate; then each fraction of the pellets produced is mixed with fine refractory material powders passive to aluminum and then the mixture is filled in moulds and heated up to a foaming temperature which exceeds the liquidus point by 50–70° C.; after completion of the foaming process the mixture is screened to separate spherical porous granules from the fine refractory material powder.

According to a further preferred embodiment, the chips produced are classified by grain sizes from 1.5 up to 40 mm, preferably up to 5 mm each size fraction is dispersed as a monolayer on a special base, heated from below up to a temperature of phase transition to liquid state; when it is examined visually that the foamed pellets reach the desired size, they are removed out of the furnace.

The foamed pellets (also called porous pellets) may then preferably be mixed with a resin and injected into the internal space of any structural element comprising one or more hollow pieces. The resin is cured to increase stiffness and energy absorption of the structural element.

According to another aspect of the invention, the chips which are not screened to size fraction are used to form a composite block which contains a flat metallic sheet with special coating on the surface of which a layer of chips is dispersed and, above this layer, at a certain height, the second metallic sheet with special coating, stamped beforehand for the desired component, is located and after this, the composite block formed is heated in a furnace up to a foaming temperature which normally exceeds the liquidus point by at least 50–70° C. and when it is examined visually that the foamed pellets reach the upper metallic layer, the block with foamed powders is removed out of the furnace and cooled. (To provide for heating of the block in inert atmosphere).

Preferably in this case, to ensure bracing between the sheets, they are fastened together by connecting crosspieces which simultaneously play a role of fastening connecting elements.

Also preferably, the chips, which are not screened to size fraction, can be used to fill to the desired volume fraction the internal space of any structural element comprising one or more hollow pieces. The whole assembly is heated above a temperature of transition from solid to liquid state of an alloy to form porous filler (core).

Figures 7A, 7B:
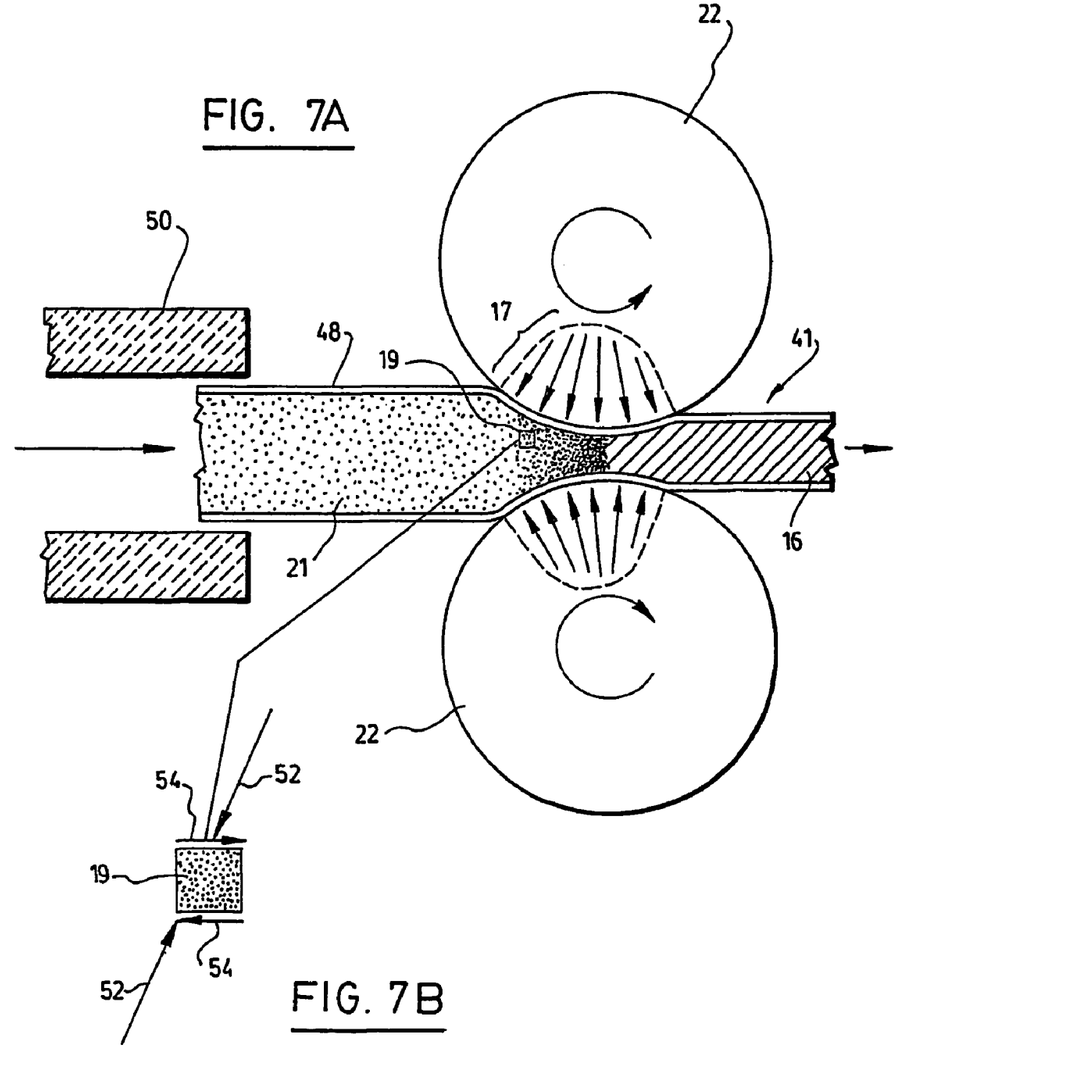
FIG. 7a represents the step of hot rolling the mixture of powders in a closed volume metal shell.
FIG. 7b is an enlarged view of the powder mixture at the nip formed by the two rolls, the micro-shear condition within the mixture of powders is illustrated with the arrows.

According to a further aspect of the invention, the rolling of the heated foamable particles is conducted together and between two or more heated metal sheets to produce a composite body. The produced composite body is heated above a temperature of transition from solid to liquid state of an alloy to form a multi-layer structure with porous core and metallic bonds between core and facings FIG. 7a shows the step of hot rolling a closed volume metal shell (48) enclosing a mixture of small particles of metal (21), preferably metal alloy powders coming from recycled aluminium scrap, and a foaming agent powder. The metal shell (48) with the mixture is first heated in a heater (50), rolled between two rolls (22) where micro-shear conditions of the particles occur; and a semi-finished foamable dense product (41) is obtained at the exit of the rolling process. As can be appreciated, in front of the nip (21) formed by the two rolls (22), the mixture of particles is substantially loose or flowable. After being processed between the rolls (22), the mixture consists of a compacted foamable mixture (16) of powder alloy with foaming agent. This compacted structure (16) is obtained by subjecting the particles (19) to micro-shear conditions, such micro-shear conditions being created thanks to the use of the closed volume metal shell (48). As can be appreciated, in the nip formed by the two rolls (22) a zone of plasticity (17) is created followed by a zone of elasticity (18). As shown in FIG. 7b, the particles (19) in the zone of plasticity (17) are subjected to compression forces represented with arrow (52) and shear forces represented by arrows (54).

Figure 10:
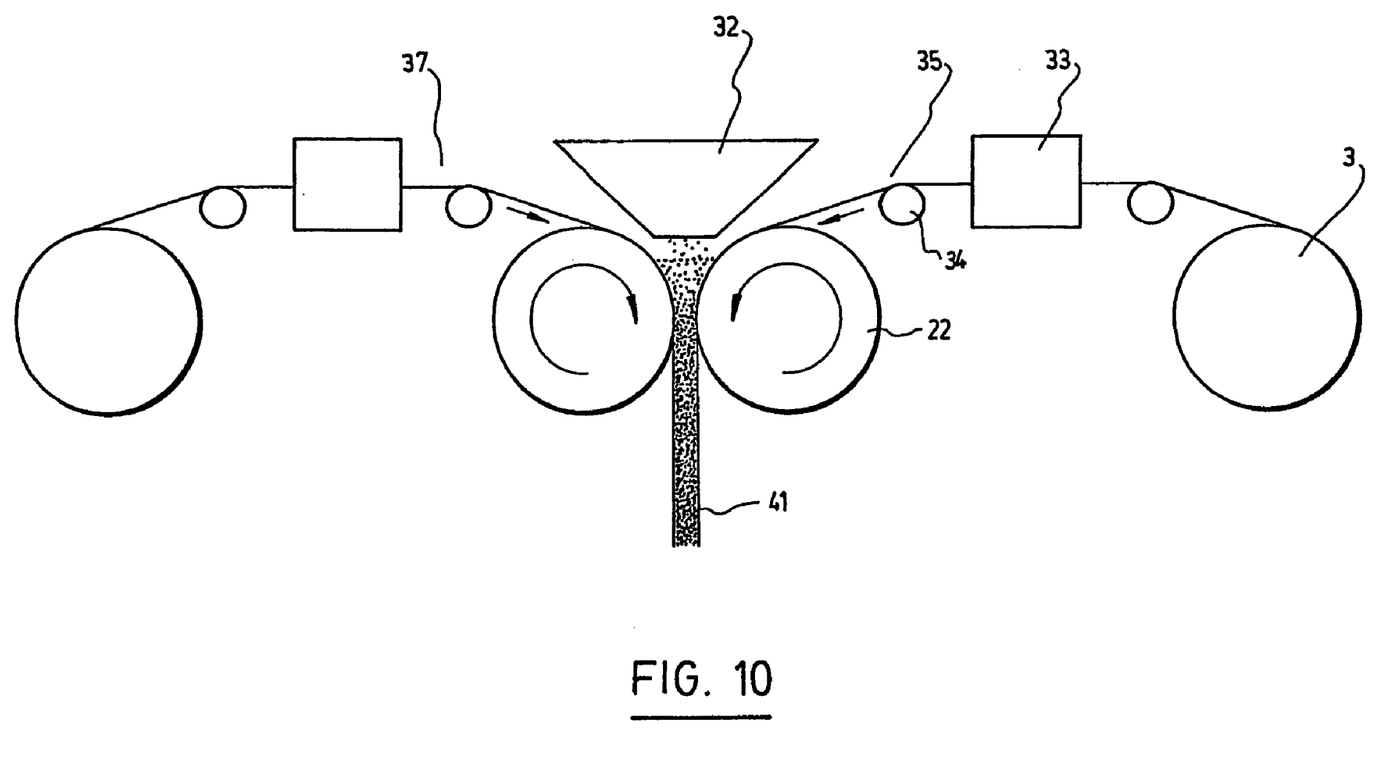
FIG. 10 represents the steps of continuous or batch rolling of chips or the powder mixture in a metal shell formed by two metal strips.

According to a further aspect of the invention shown in FIG. 10, the hot chips, and/or a hot mixture of aluminum powder and a foaming agent, are poured into a thermostatic feeder (32), where increase in density and movement of chips and/or mixture is induced by vibration, and rolled between two metal strips supplied by coils (36) heated at the furnace (33) to a temperature of about 100° C. higher than the temperature of the chips. The produced composite body (41) is heated above a temperature of transition from solid to liquid state of an alloy to form a sandwich structure with porous core and metallic bonds between core and facings.

Figure 11:
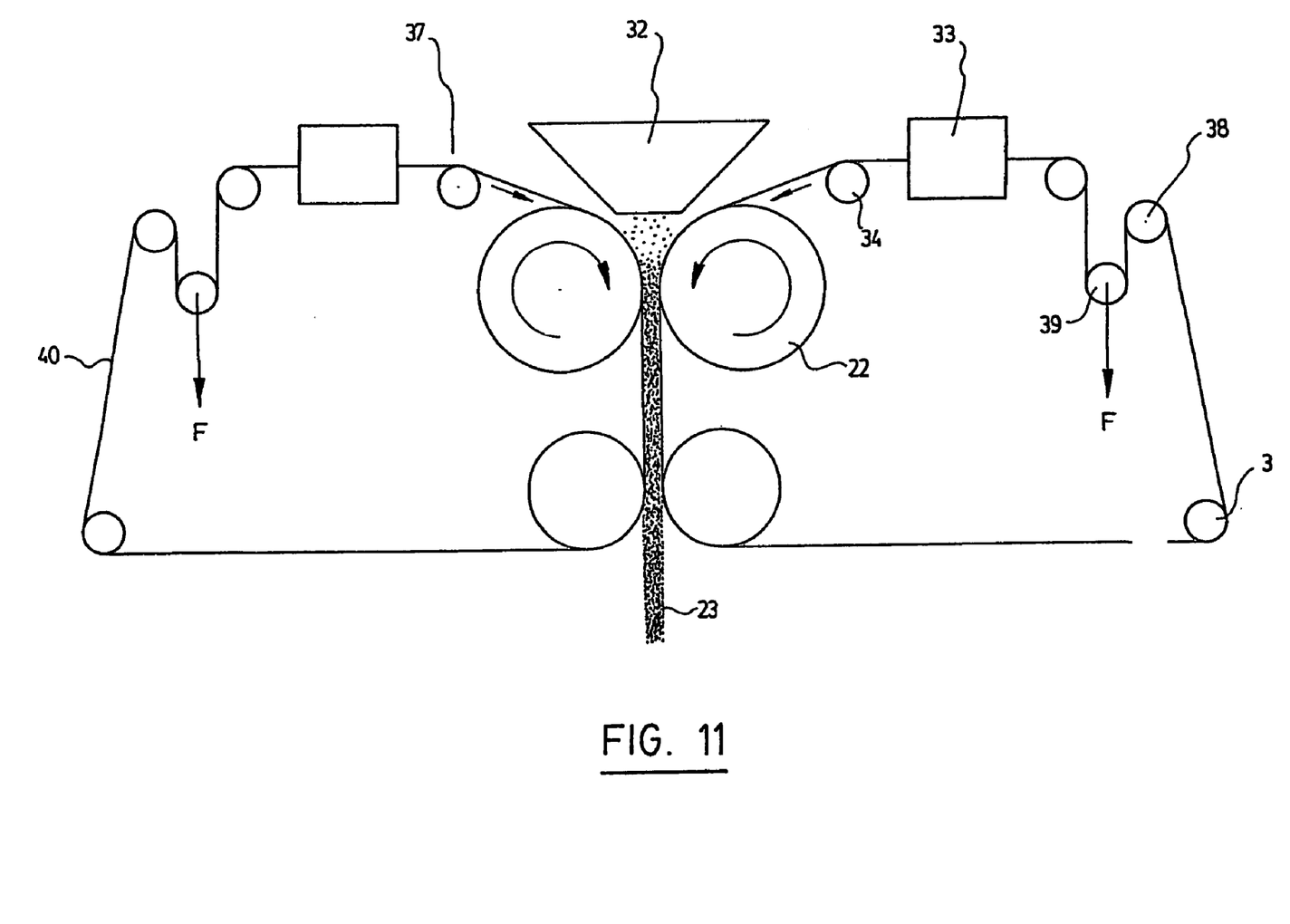
FIG. 11 represents the steps of continuous rolling of chips or the powder mixture in a metal shell formed by two continuous metal strips.

According to a further aspect of the invention shown in FIG. 11, the hot chips, and/or a hot mixture of aluminum powder and a foaming agent, are poured into a thermostatic feeder (32), where increase in density and movement of chips and/or mixture is induced by vibration, and rolled between two continuous metal strips (40) heated at the furnace (33) to a temperature of about 100° C. higher than the temperature of the chips. The hot-rolled sheets (23) produced are cut to blanks, which are fed to a heat treatment.

Figure 12:
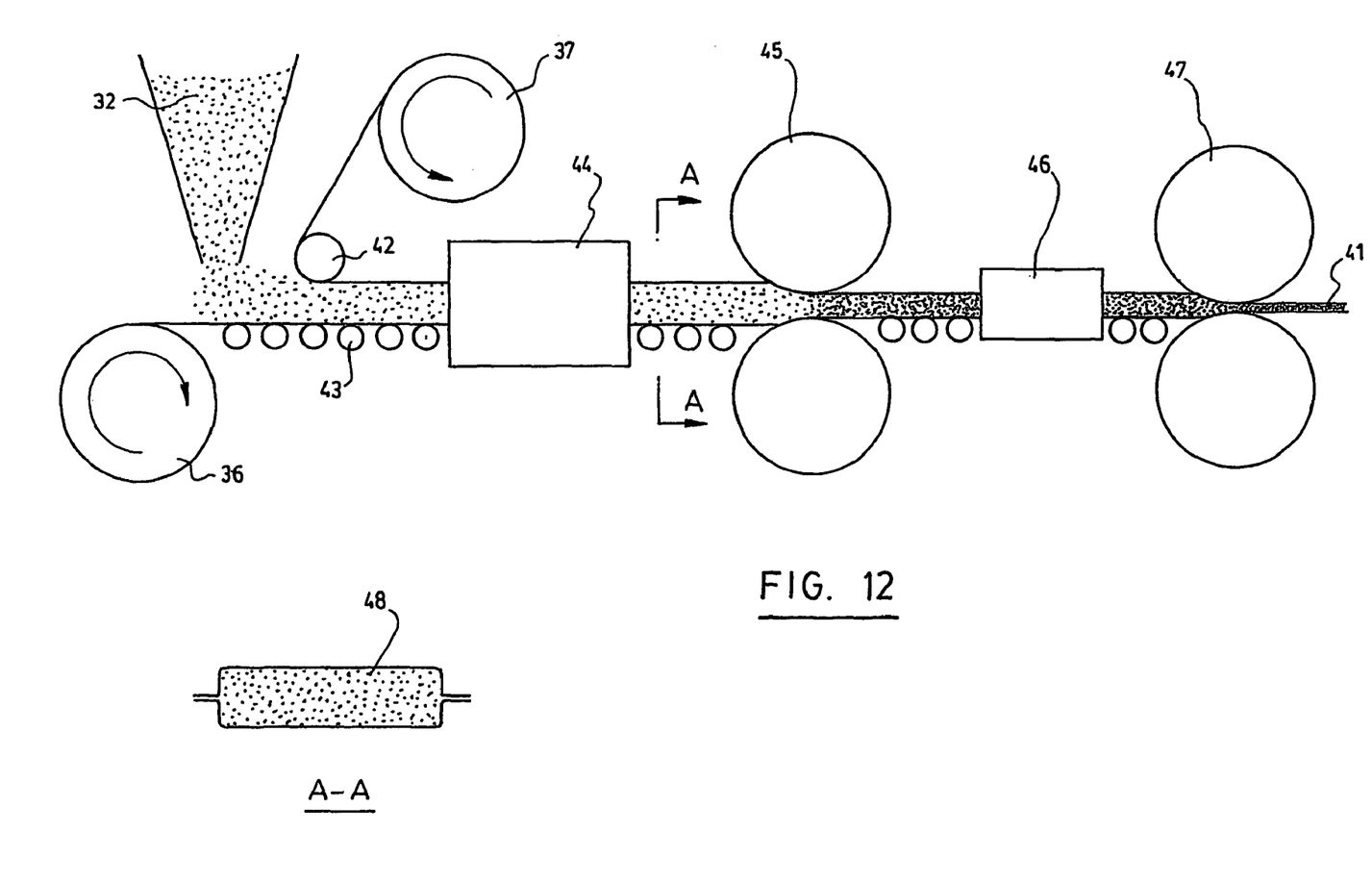
FIG. 12 represents the steps of continuous rolling of chips or the powder mixture in a closed volume metal shell.

According to a further aspect of the invention shown in FIG. 12, the hot chips, and/or a hot mixture of aluminum powder and a foaming agent, are poured into a thermostatic feeder (32), where increase in density and movement of chips is induced by vibration, then poured on a metal strip from the coil (36) moving on a roller table (43). The chips and/or mixture of powder are then covered by an upper metal strip from coil (37), moved to a machine (44) for forming a shell and for joining the edge of the lower and upper metal strips. A closed cross section metal shell (48) filled with chips and/or the mixture of powder is thus formed in that machine (44). The shell is then straightened and density of chips and/or mixture of powder increased in a straightening machine (45) and heated in a furnace (46). The heated shell is then hot rolled in a rolling mill (47). The produced composite body (41) is heated above a temperature of transition from solid to liquid state of the alloy obtained with the original mixture of powder to form a sandwich structure with porous core and metallic bonds between core and facings.

Alternatively, the metal shell (48) from the shell-forming machine (44) shown in FIG. 12 may be cut to blanks so to form a closed volume metal shell (48). Such closed volume metal shell (48) is then processed, as described above, to be straightened, heated, hot rolled and heated to a high temperature to form a sandwich structure with a porous core.

The possibility of realization of the invention characterized by the above-mentioned set of the signs and the possibility of the realization of the purpose of the invention can be corroborated by the description of the following examples.

EXAMPLE 1

The example of the realization of the method for production of dense foamable chips is as follows.

Figure 8:
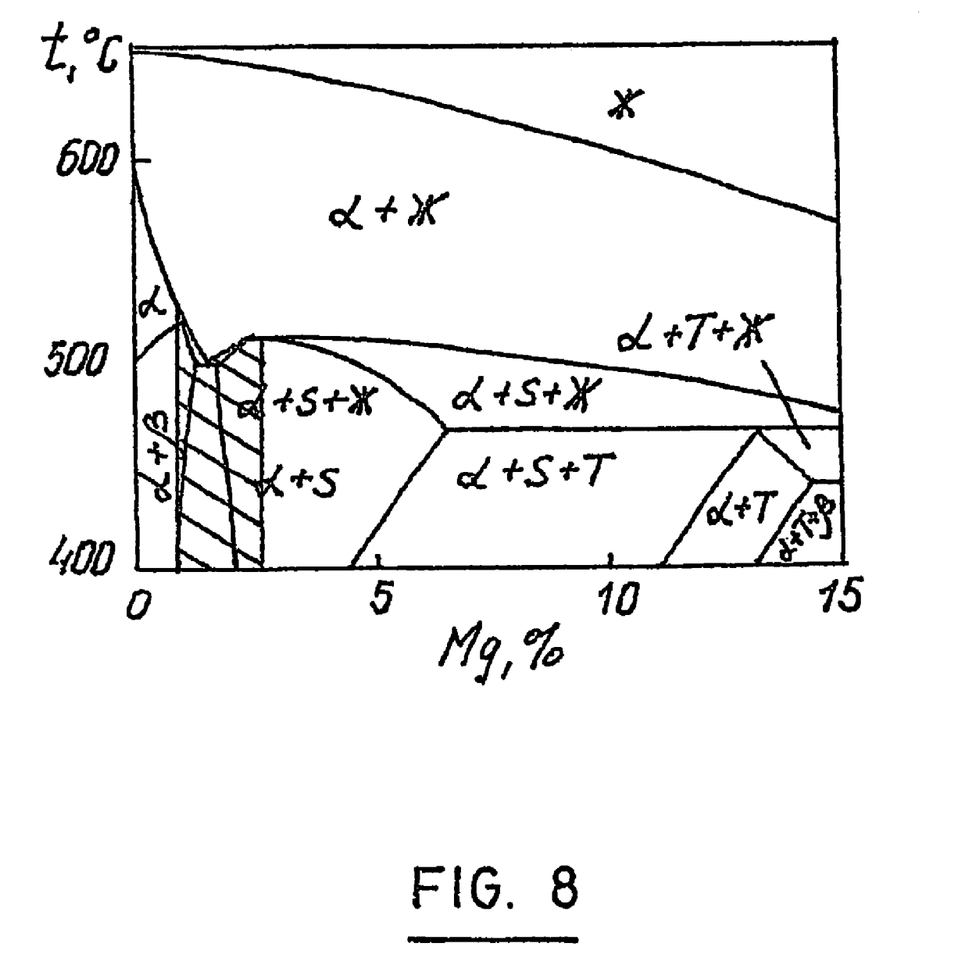
FIG. 8 is a phase diagram of the powder alloy: Al—Si.

Al—Mg—Cu—Mn aluminum alloy powder (a liquidus temperature of the alloy is 640–645° C., a temperature of low-melting point eutectic is 505° C.) of 300 kg in weight was mixed with $TiH_2$ foaming agent of 3.25 kg in weight (a decomposition temperature is 690° C. and filled in a split mould of 340 mm diameter, 800 mm in height with internal space of 290 mm in diameter. FIG. 8 shows a vertical cross section of the phase diagram of Al—Mg—Cu—Mn alloys. Hatched zone in this figure represents alloys used in the process. As can be appreciated, the average solidus temperature is 503° C. and the liquidus temperature is approximately 650° C. The powder mixture was compacted by vibration to obtain a density of 1.75–1.8 g/cm3. Weight of the mixture in each mould was from 97 up to 100 kg. The powder mixture was heated at a temperature of 510–515° C. to ensure liquid-phase sintering after cooling down to a temperature of 480–485° C., the powder mixture lost its flowability. After disassembling of the mould, the hot mould was placed on the container of a 10 MN or 15 MN capacity vertical press. The diameter and height of the container were 300 and 800 mm respectively. The ram of the press pushed the sintered powder mixture into the press container, then a dummy-block was placed and hot compaction of the sintered powder mixture was carried out at a low specific pressure of 140–200 MPa. The hot-compacted briquettes produced showed a density of 86–92 rel. %. After cooling the briquettes were reduced on special machines to fragment-shaped chips.

Heating of the primary powders above a temperature of appearance of low-melting point eutectic by 10–20° C. and subsequent cooling below this temperature by 20–30° C. ensure development of liquid-phase powder sintering. The powder mixture in this state loses its flowability and can be easily pushed from the mould into the press container. The first source of appearance of extremely low hydrogen amounts is decomposition of $TiH_2$ at a heating temperature. The second source is surface hydrogen appeared due to reaction of absorbed ($H_2O$ molecules) with aluminum cations which diffuse through an oxide film. Surface hydrogen and hydrogen formed due to decomposition of $TiH_2$ leave the porous briquettes partially, while the largest hydrogen amount is capable of dissolving in appeared low-melting point eutectic.

Then, hot compaction operation at a low pressure of 140 or 200 MPa is carried out. Pressure applied to a sintered briquette is able to form only a porous briquette. The porous state is necessary only to facilitate production of the chips on special machines. The main operation i.e. hot compaction is a waste-free process.

If the heating of the primary powder mixture is performed at a temperature wherein the particles do not bond for example a temperature of 10–20° C. below that of low-melting point eutectic formation, the particle will not bond and the powder mixture obtained will retain its flowability. Transportation of the disassembled mould to the press container will be impossible, a briquette structure will be loose.

EXAMPLE 2

Figure 9:
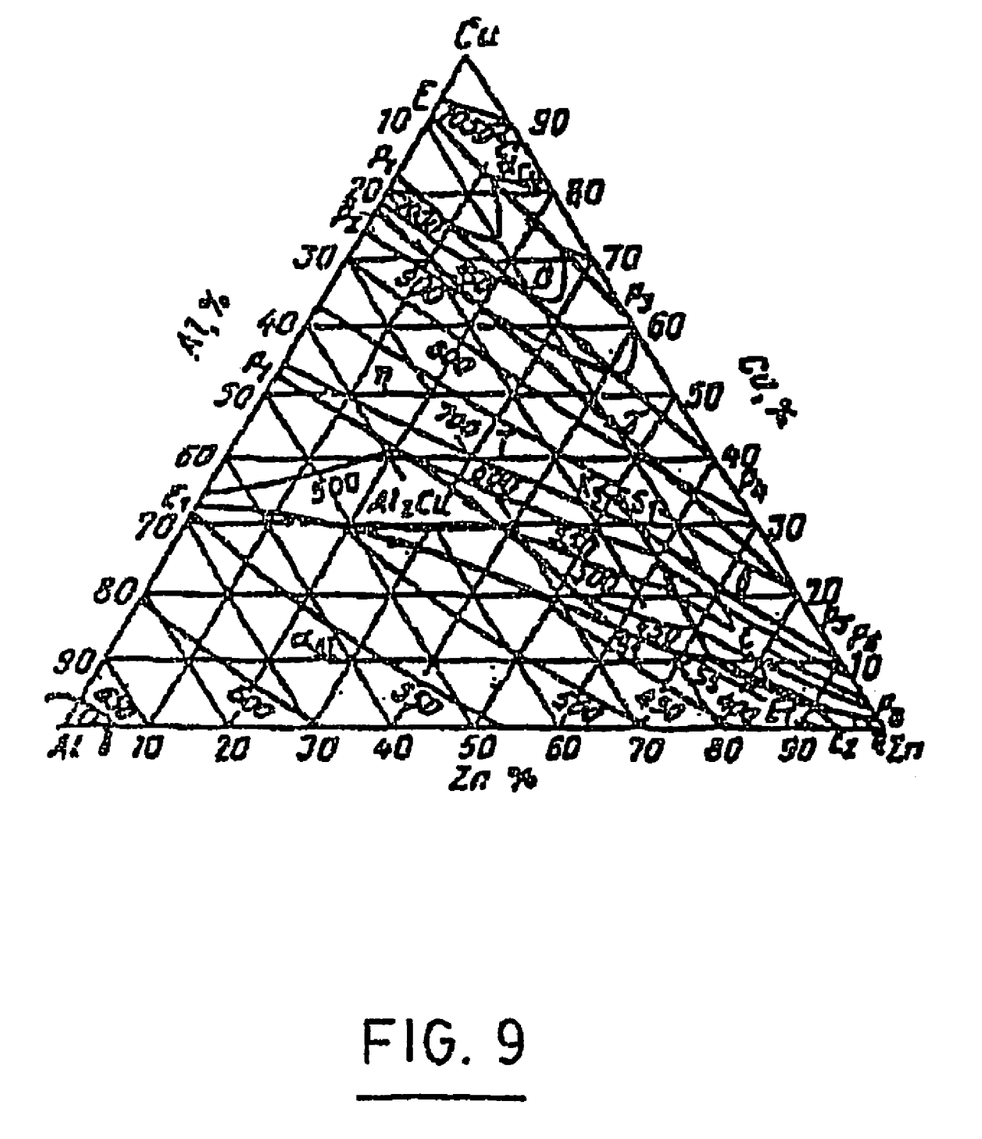
FIG. 9 is a phase diagram of the powder alloy: Al—Mg—Cu—Mn.

The example of realization of the method for production of porous semi-finished pellets from the foamable chips is as follows:

Al—Zn—Cu—Mg aluminum alloys powder (a liquidus temperature of the alloy is 630–640° C., a temperature of low-melting point eutectic formation is 480° C. of 210 kg in weight was mixed with $CaCO_3$ foaming agent of 12 kg in weight (a decomposition temperature is 720° C.) and filled in a split mould of 340 mm in diameter, 800 mm in height with internal space of 290 mm in diameter. FIG. 9 shows surfaces of crystallization (surfaces of liquidus) of the powder alloy Al—Zn—Cu—Mg containing Zn-4, 5%, Cu 3.5–4.5%, Mg-negligible, Al-balance. The alloys used are in the AL corner of the diagram (small hatched zone) and have a liquidus temperature of 650° C. Solidus of these alloys is in the interval of temperatures of 510–520° C. The powder mixture was compacted by vibration to obtain a density of 1.75–1.8 g/cm³. Weight of the mixture in each mould was from 97 up to 100 kg. The powder mixture was heated at a temperature of 490–500° C. to ensure liquid-phase sintering after cooling down to 450–460° C. and the mixture lost its flowability. After disassembling of the mould, the hot mould was placed on the container of a 10 MN or 15 MN capacity vertical press. The diameter and height of the container were 300 and 800 mm respectively. The ram of the press pushed the sintered powder mixture into the press container, then a dummy-block was placed and hot compaction of the sintered powder mixture was carried out at a low specific pressure of 140–200 MPa. The hot-compacted briquettes produced showed a density of 86–92 rel.%. After cooling, the briquettes were reduced on special machines to fragment-shaped chips.

To realise the method, the chips produced were graded into grain sizes of 2.0, 3.0, 4.0 and 5.0 mm, each size fraction was mixed with fine refractory material powders passive to aluminium, the mixture was filled in moulds, heated in a furnace at a foaming temperature which exceeds the transition temperature from solid to liquid state by 50–70° C.; after completion of the foaming process, the mixture was screened to separate the refractory material powders from porous pellets. The porous pellets from 3.0 up to 10.0 mm in size and 0.3 up to 0.9 g/cm3 in density are a good filling agent for any shape of cases for energy absorbing components used in the automotive industry.

An easier technique for realization of the chips of the same alloy, graded into grain sizes of 2.0, 3.0, 4.0 and 5.0 mm is discussed below. Each fraction was dispersed as a monolayer on a special base, heated in a furnace from below on overheated melt of salt up to a foaming temperature; when it was examined visually that the foamed pellets reached the desired size, they were removed out of the furnace and cooled. The pellets had a hemispheric shape with radius from 5.0 up to 20.0 mm and a density from 0.4 up to 1.0 g/cm3.

Porous pellets of this size and shape can find application for production of volumetric noise suppression and fire barrier components and also large-size shock absorption elements. Product yield is 100%.

EXAMPLE 3

An example of the realization of the method for production of flat porous semi-finished products is as follows.

Al—Mg—Cu—Mn aluminum alloy powder (a liquidus temperature of the alloy is 640–645° C., a temperature of low-melting point eutectic is 505° C.) of 30 kg in weight was mixed with $TiH_2$ foaming agent of 0.32 kg in weight and filled in 10 closed volume metal shells with length 500 mm, width 120 mm and thickness 10 mm. The powder mixture was compacted by vibration and a pass through the straightening machine to obtain a density of 1.8–2.0 g/cm3. Weight of the mixture in each shell was from 2.9 up to 3.2 kg. Then the powder mixture in a shell was heated at a high rate in a furnace to a temperature 515–550° C. and fed on a rolling mill on which 29 kg of 120×1000×5 mm blanks with metal facing and foamable core were rolled. The blanks were used for free foaming of sandwich panels. High-temperature heat treatment was carried out by heating of the sheet blanks from below on overheated melts of salts. At the required point, the foaming process was stopped by quick removal of the foamed sandwich panel from the furnace when thickness was 24.5 mm. The size of the panel with porous core was 122×1005×24.5 mm. The lower and upper surface of the panels was smooth. The density of the porous semi-finished products produced was 0.96–1.07 g/cm3. Panels yield was 95%.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

What is claimed is:

1. A method for the production of metal chips comprising the steps of:
   i) providing a mixture of a metal alloy powder with a foaming agent powder, said foaming agent having a given decomposition temperature above which the foaming agent decomposes into gas, and said powders comprising finely dispersed solid particles;
   ii) pre-compacting the mixture of step i);
   iii) heating the pre-compacted mixture of step ii) to a temperature below said decomposition temperature and at which permanent bonding of the particles can occurs;
   v) hot compacting the mixture obtained in step iii) for producing a compacted body made of a metal matrix embedding the foaming agent; and
   vi) reducing the compacted body into metal fragments and thereby obtaining foamable metal chips.

2. A method as defined in claim 1, wherein the step i) of providing the metal alloy powders and the foaming agent powder comprises the step of:
   disintegrating metal scraps, metal particles or metal chips into said metal alloy powder.

3. A method as defined in claim 1, comprising, after step vi), the steps of:
   heating the foamable chips to a temperature below a liquidus temperature of said metal alloy and sufficient to make the metal chips plastic; and
   extruding the heated metal chips to produce a foamable metal wire.

4. A method as defined in claim 3, comprising after the step of extruding, the step of:
   cutting the wire into smaller foamable wire segments.

5. A method as defined in claim 1 for producing porous metal pellets, comprising the additional step of:
   vii) heating the foamable metal chips obtained in step vi) to a temperature above said decomposition temperature of the foaming agent.

6. A method as defined in claim 5, comprising, prior to step vii) of heating the metal foamable metal chips, the step of:
   mixing said foamable metal chips with other powders.

7. A method as defined in claim 6, wherein the other powders are made of refractory material powders.

8. A method as defined in claim 7, comprising, prior to mixing the foamable metal chips with the refractory material powders, the steps of:
   heating the foamable metal chips to a temperature below a liquidus temperature of said metal alloy and sufficient to make the metal chips plastic; and
   shaping the metal chips into metal granules.

9. A method as defined in claim 8, wherein the metal granules are spherical.

10. A method as defined in claim 9, wherein the step of shaping the metal chips into metal granules comprises the steps of:
    dispersing the heated chips as a monolayer on a flat heated surface;
    applying a heated plate over said monolayer, and shaping the metal granules by simultaneously applying pressure with the heated plate and performing circular movement with the same.

11. A method as defined in claim 9, comprising, after step vi) of disintegrating, the step of:
    classifying the metal chips by grain sizes.

12. A method as defined in claim 11, wherein the grain sizes range from 1.55 mm to 40 mm.

13. A method as defined in claim 12, wherein the metal powders are aluminum alloy powders.

14. A method as claimed in claim 13 wherein the foaming agent is selected from the group consisting of $TiH_2$ and $CaCO_3$.

15. A method as claimed in claim 14, wherein the step v) of hot compacting is hot rolling.

16. A method as claimed in claim 10, wherein the metal granules are further incorporated in a material selected from a group consisting of a polymeric material, a soundproof material, a fireproof material and a shock absorption material.

17. A method as claimed in claim 16, wherein the polymeric material is a resin.

18. A method of obtaining the foaming agent-containing metal particles, including the following steps:
    i) mixing metal particles with the powder of foaming agent, for example $TiH_2$, $CaCO_3$ and other;
    ii) pre-compaction of the obtained mixture of powders of step i) to a blank;
    iii) heating the blank of step ii) to the sintering temperature of metal particles, but lower than the temperature of dissociation of foaming agent;
    iv) hot pressing of the blank of step iii) to obtain compact material;
    v) mechanical grinding of the material of step iv) to obtain the foaming agent-containing metal particles.

19. A method, as it is determined in patent formula 18, for obtaining the porous metal granules, including the additional step:
    vi) heating metal particles of step v) to the temperature exceeding the temperature of decomposition of foaming agent.

20. A method, as it is determined in patent formula 19, before step vi) heating metal particles of step v), including the following steps:
    vii) mixing metal particles with the powders of refractory materials;
    viii) heating the powder mixture of step vii) to the temperature, lower than the liquidus temperature to create a plastic state of the metal powder.

21. A method, as it is determined in patent formula 20, including the following steps;
    spheroidization of metal particles with the aid of heated flat plates;
    application of pressures on the plates and execution by them of circular motions;
    sorting of metal particles according to sizes.

22. A method, as it is determined in the points of patent formula 18, in which metal particles are aluminum alloys.

23. A method, as it is declared in the points of patent formula 18, in which step iv) of hot pressing is the hot rolling.

24. A method, as determined in the points of patent formula 19, wherein the granules are further incorporated as a filler material into a polymeric material, sound absorbing or damping material.

* * * * *